(12) United States Patent
Chou

(10) Patent No.: US 9,766,480 B1
(45) Date of Patent: Sep. 19, 2017

(54) ASSEMBLED STRUCTURE OF MAIN SPECTACLE FRAME AND ASSISTANT LENS FRAME

(71) Applicant: HSIEN CHANG OPTICAL INDUSTRIAL CO., LTD., Tainan (TW)

(72) Inventor: Wen-Hsiung Chou, Tainan (TW)

(73) Assignee: Hsien Chang Optical Industrial Co., Ltd., Tainan (TW)

( * ) Notice: Subject to any disclaimer, the term of this patent is extended or adjusted under 35 U.S.C. 154(b) by 0 days.

(21) Appl. No.: 15/073,984

(22) Filed: Mar. 18, 2016

(51) Int. Cl.
*G02C 9/00* (2006.01)
*G02C 5/14* (2006.01)
*G02C 5/00* (2006.01)
*G02C 7/10* (2006.01)

(52) U.S. Cl.
CPC .............. *G02C 9/00* (2013.01); *G02C 5/008* (2013.01); *G02C 5/146* (2013.01); *G02C 7/10* (2013.01); *G02C 2200/32* (2013.01)

(58) Field of Classification Search
CPC ... G02C 9/00; G02C 9/02; G02C 9/04; G02C 13/001; G02C 2200/06; G02C 2200/08; G02C 2200/20; G02C 2200/26

USPC ........................................ 351/47, 48, 57, 58
See application file for complete search history.

(56) References Cited

U.S. PATENT DOCUMENTS

| | | | | |
|---|---|---|---|---|
| 6,712,465 B1* | 3/2004 | Teng | ......................... | G02C 9/00 351/47 |
| 2014/0327872 A1* | 11/2014 | Lin | ......................... | G02C 1/04 351/103 |

* cited by examiner

*Primary Examiner* — Huy K Mai
(74) *Attorney, Agent, or Firm* — Rosenberg, Klein & Lee

(57) ABSTRACT

The invention relates to an assembled structure of a main spectacle frame and an assistant lens frame. Sliding slots having fixing parts are disposed on inner sides of the lens frame of the main spectacle frame. Through holes are disposed in front of the lens frame and positioned to correspond to the sliding slots. The assistant lens frame is disposed on the front side of the lens frame of the main spectacle frame. Positioning bumps are protrudingly disposed on inner sides of the assistant lens frame to correspond to the through holes on two sides of the lens frame of the main spectacle frame. Tip holes are disposed on lateral sides of the positioning bumps to be inserted by tip rods for positioning correspondingly.

6 Claims, 8 Drawing Sheets

ASSEMBLED STRUCTURE OF MAIN SPECTACLE FRAME AND ASSISTANT LENS FRAME

BACKGROUND

Field of Invention

The disclosure relates to an assembled structure of a spectacle frame and an assistant lens frame. More particularly, the disclosure relates to an assembled structure of easily and stably assembling an assistant lens frame onto a lens frame of a main spectacle frame.

Description of Related Art

In the present spectacle industry, spectacles are either clip-on type or magnetic type. The assistant lens frame with sunglasses of a clip-on spectacle is disposed in front of the main spectacle frame with optical lens, and a clip is disposed on the center of the assistant lens frame for fixing the assistant lens frame onto the main spectacle frame. Although the clip can fix the assistant lens frame onto the main spectacle frame, the assistant lens frame will be rocked when the user is dosing some activities. Therefore, the assistant lens frame cannot be stably fixed. For the magnetic spectacles, attracting magnetic parts are respectively disposed on the main spectacle frame and the assistant lens frame. However, the magnetic attracting force will be decreased as the using time of the magnetic parts is increased. Therefore, the assistant lens frame will drop when the user is doing some activities to cause the wearing and tearing problems of the lens of the assistant lens frame. Therefore, the existing clip-on or magnetic spectacles all are not capable of stably positioning the main spectacle frame and the assistant lens frame.

SUMMARY

This invention is related to an assembled structure of a main spectacle frame and an assistant lens frame. A main purpose of this invention is to provide a mutual positioning design of using positioning bumps on two sides of the assistant lens frame and fixing parts on two sides of the lens frame of the main spectacle frame to stably fix the assistant lens frame onto the lens frame of the main spectacle frame. Therefore, the assistant lens frame can be effectively prevented from being dropped from the main spectacle frame in activities.

DETAILED DESCRIPTION

Figure 1:
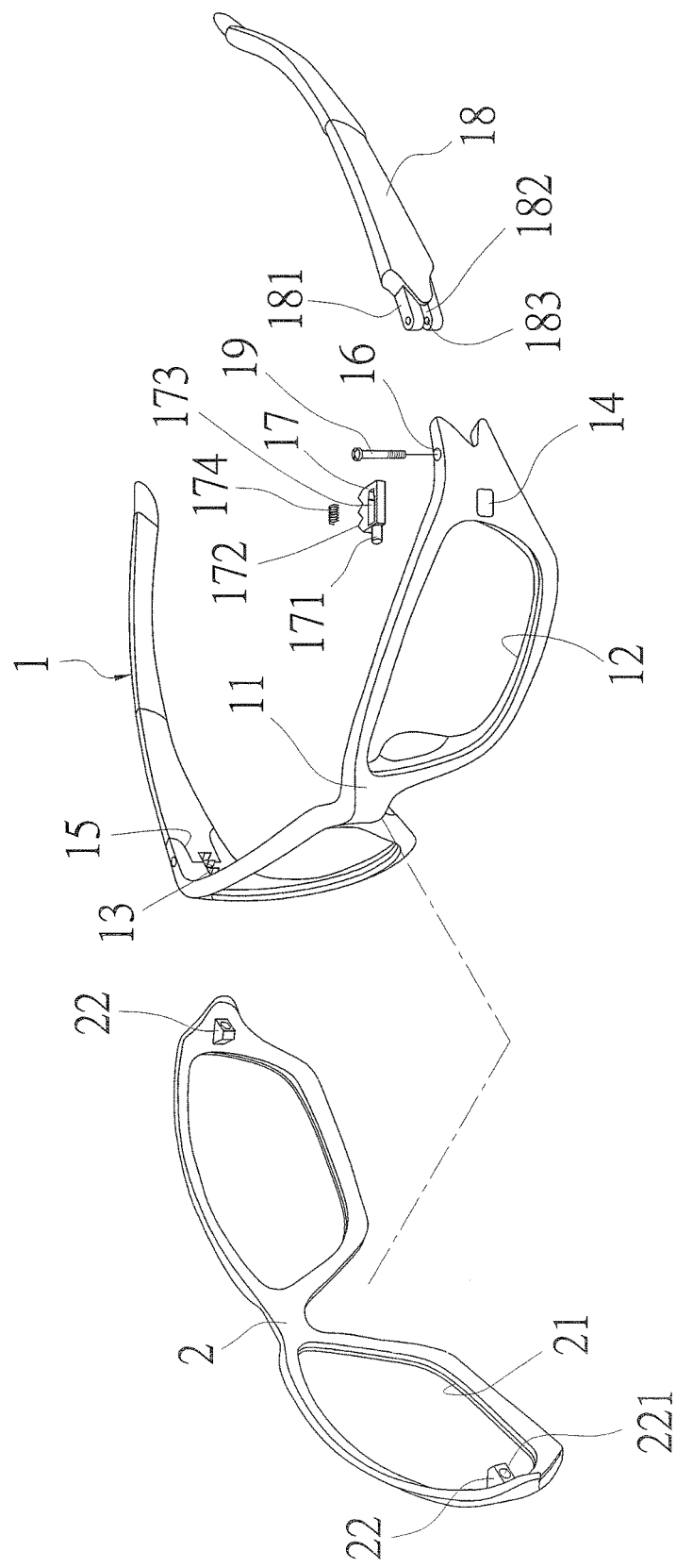
FIG. 1 is an exploded perspective view of a first embodiment of this invention.

First, please refer to FIG. 1. The assembled structure of an assistant lens frame of a spectacle comprises a main spectacle frame 1 and an assistant lens frame 2.

The main spectacle frame 1 has a lens frame 11. Two first lens assembling parts 12 disposed on the lens frame 11 for installing optical lens, such as near-sighted glasses, far-sighted glasses, or reading glasses. Two sliding slots 13 are respectively disposed on inner sides of the lens frame 11. Two through holes 14 are disposed on two front sides of the lens frame 11, and the through holes 14 are communicated with the sliding slots 13. The sliding slots 13 are extended to form connecting slots 15, and the connecting slots 15 are extended to the lateral sides of the lens frame 11. First locking holes 16 are penetratingly disposed on the two sides of the lens frame 11 from top to bottom, and the locking holes 16 penetrate the connecting slots 15. Fixing parts 17 are respectively disposed in the sliding slots 13 on two lateral sides of the lens frame 11. One end of the fixing parts 17 each has a tip rod 171 to be positioned to correspond to the position of the through holes 14. Serrated toggle parts 172 are respectively disposed on inner sides of the fixing parts 17, and the toggle parts 172 are slightly protruded from the sliding slots 13. A long slot hole 173 is disposed to vertically penetrate is the fixing part 17. An elastic part 174, such as a spring, is disposed in the long slot hole 173. The two sides of the lens frame 11 are respectively installed by a temple 18. Front terminals of the temples 18 are formed to be connecting sections 18 for connecting the connecting slots 15. Receiving parts 182 are disposed at the center of the connecting sections 181 of the temples 18 to correspond to the sliding slots 13 of the lens frame 11, and thus the fixing parts 17 can movably slide toward the receiving parts 182 of the temples 18. Second locking holed 183 vertically penetrate the connecting sections 181 of the temples 18 to correspond to the lock holes 16 of the lens frame 11. Two locking parts 19, such as bolts, are disposed to respectively penetrate the first locking holes 16 on two sides of the of the lens frame 11, the long slot holes 173 of the fixing parts 17, and the second locking holes 183 of the temples 18 to let the temples 18 and the lens frame 11 are pivotally connected. One ends of the elastic parts 174 in the long slot holes 173 of the fixing parts 17 are against the adjacent ends of the tip rods 171. The other ends of the elastic parts 174 are positioned to be against the locking parts 19 in the long slot holes 173 and penetrating the fixing parts 17.

The assistant lens frame 2 is disposed on a front side of the lens frame 11 of the main spectacle frame 1. The assistant lens frame 2 has two second lens assembling parts 21 for installing UV lens or other eye-protecting lens. The positions of the two second lens assembling parts 21 of the assistant lens frame 2 are corresponding to the positions of the two first lens assembling parts 12 of the lens frame 11 of the main spectacle frame 1. Positioning bumps 22 are disposed on two inner sides of the assistant lens frame 2 for penetrating the through holes 14 of the lens frame 11 of the main spectacle frame 1. Tip holes 221 are disposed on lateral sides of the positioning bumps 22 for being inserted by the tip rods 171 of the fixing parts 17.

Figure 2:
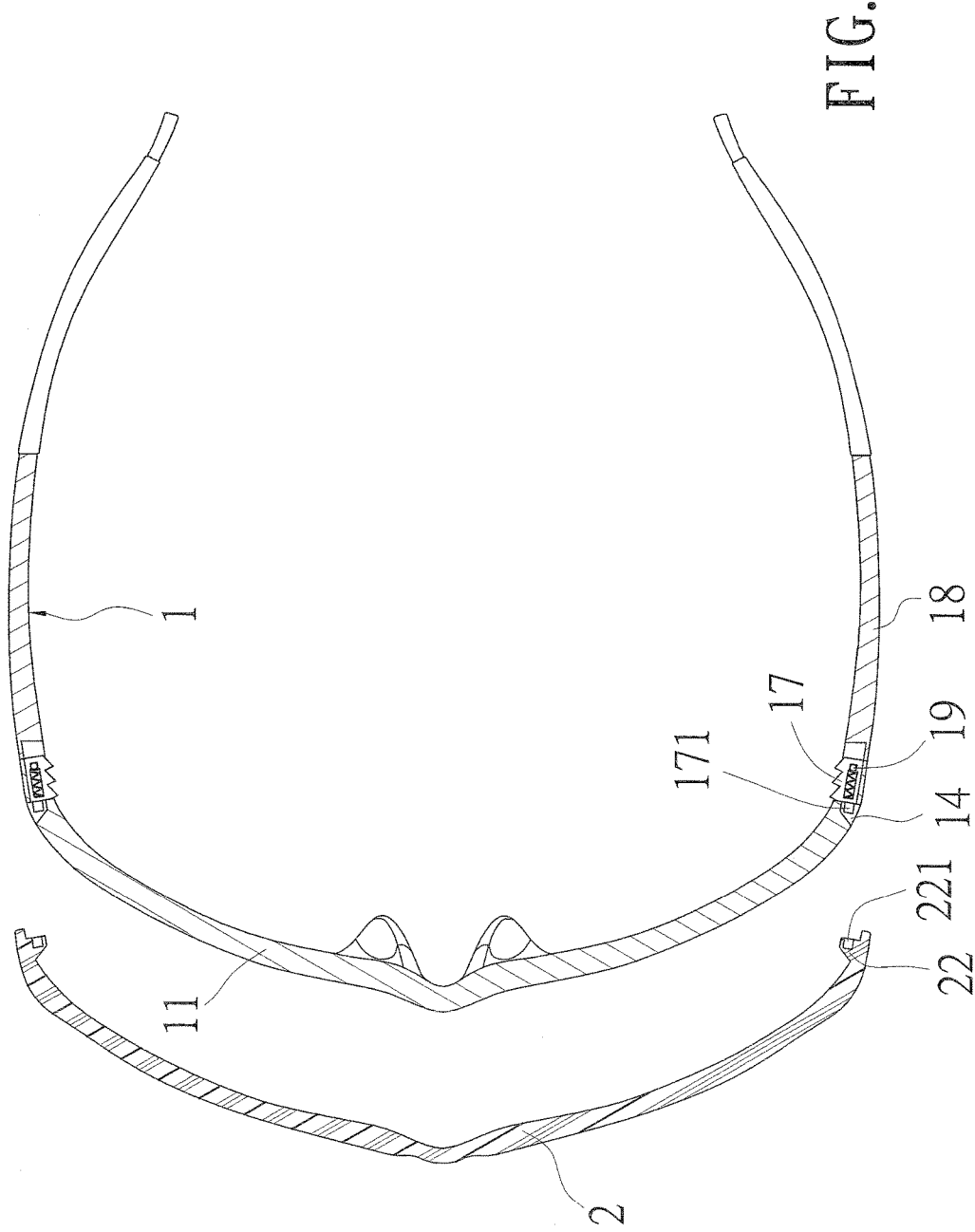
FIG. 2 is a first cross-sectional view of the first embodiment of this invention.
Figure 3:
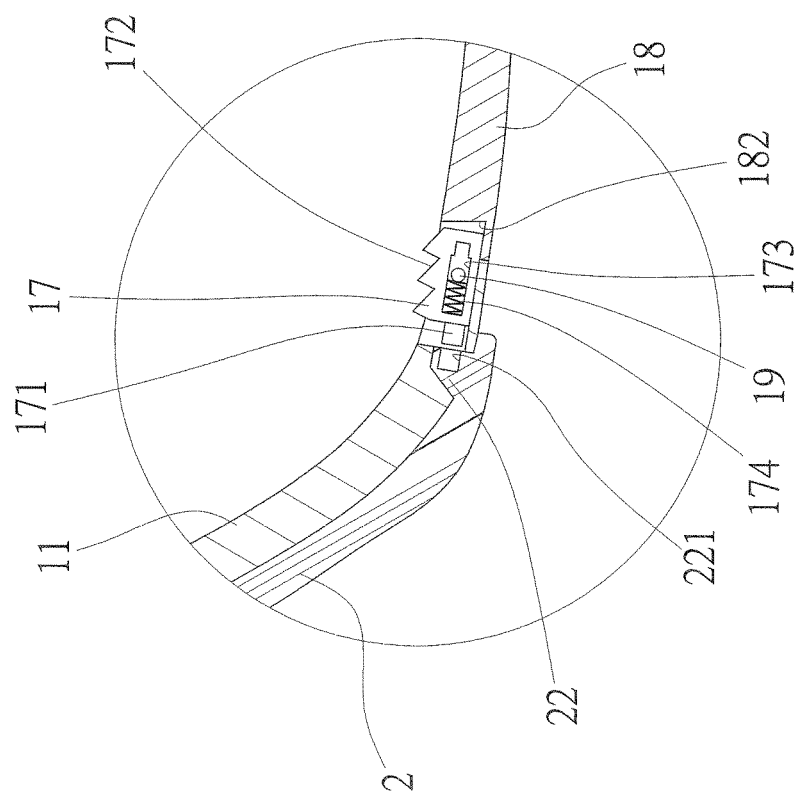
FIG. 3 is a second cross-sectional view of the first embodiment of this invention.

Accordingly, a user can usually wear a main spectacle frame 1 with optical lens for correcting myopia, hyperopia, or presbyopia. When the user goes out for outdoor activities or for constructing works, the user will need to prevent UV or foreign matters from harming his/her eyes. Please refer to FIGS. 1 and 2 at the same time. Then, the user can take an assistant lens frame 2 with UV lens or eye-protecting lens to put on the front side of the lens frame 11. Please also refer to FIG. 3. Then, the positioning bumps 22 protrudingly disposed on two sides of the assistant lens frame 2 penetrate the through holes 14 on two sides of the lens frame 11 of the main spectacle frame 1. At this time, the user uses his/her hand to fiddle the serrated toggle part 172 to move the fixing part 17 toward the temples 18 and then slide to the receiving parts 182 of the connecting section 181 of the temples 18. At this time, the tip rods 171 of the fixing parts 17 escapes from the through holes 14 of the lens frame 11. The elastic parts 174 between the end of the long slot holes 173 of the fixing parts 17 and the locking parts 19 are compressed.

Figure 4:
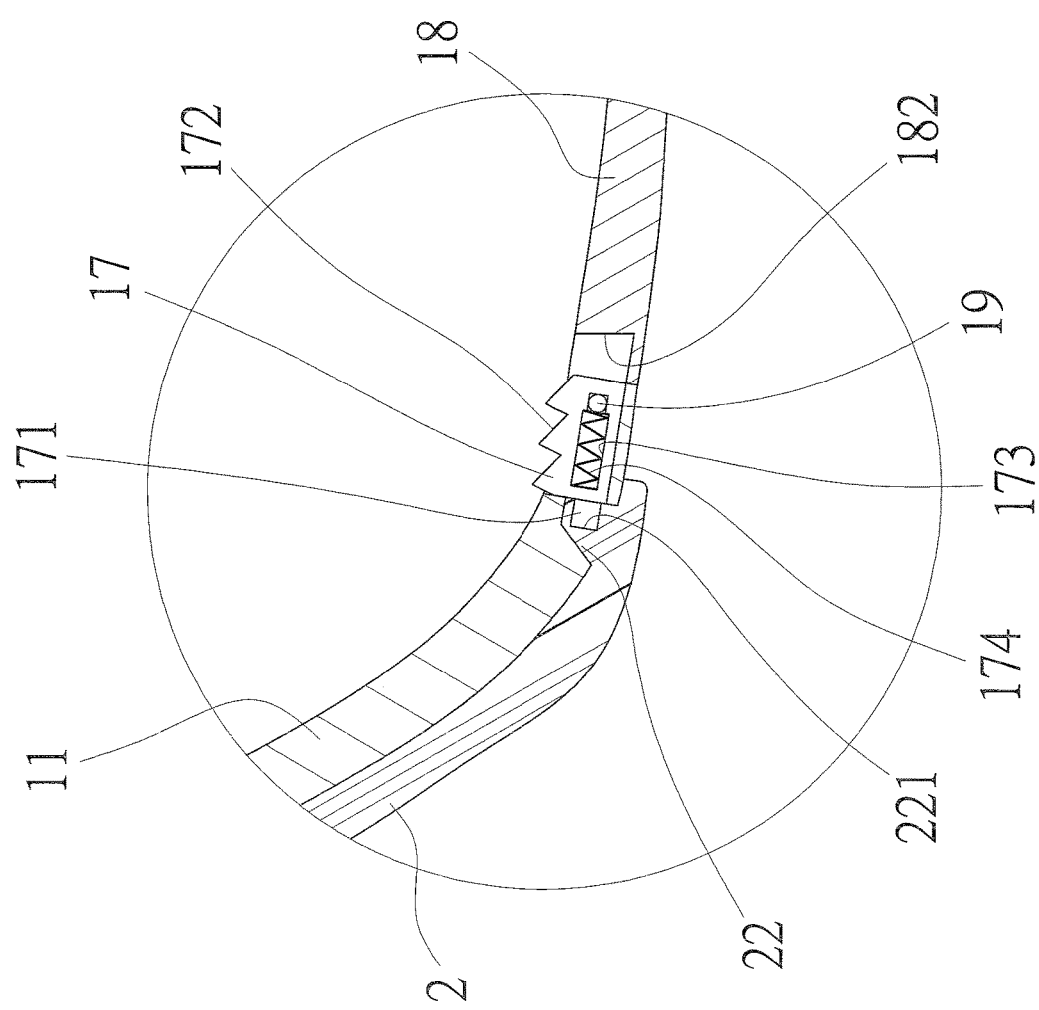
FIG. 4 is a third cross-sectional view of the first embodiment of this invention.
Figure 5:
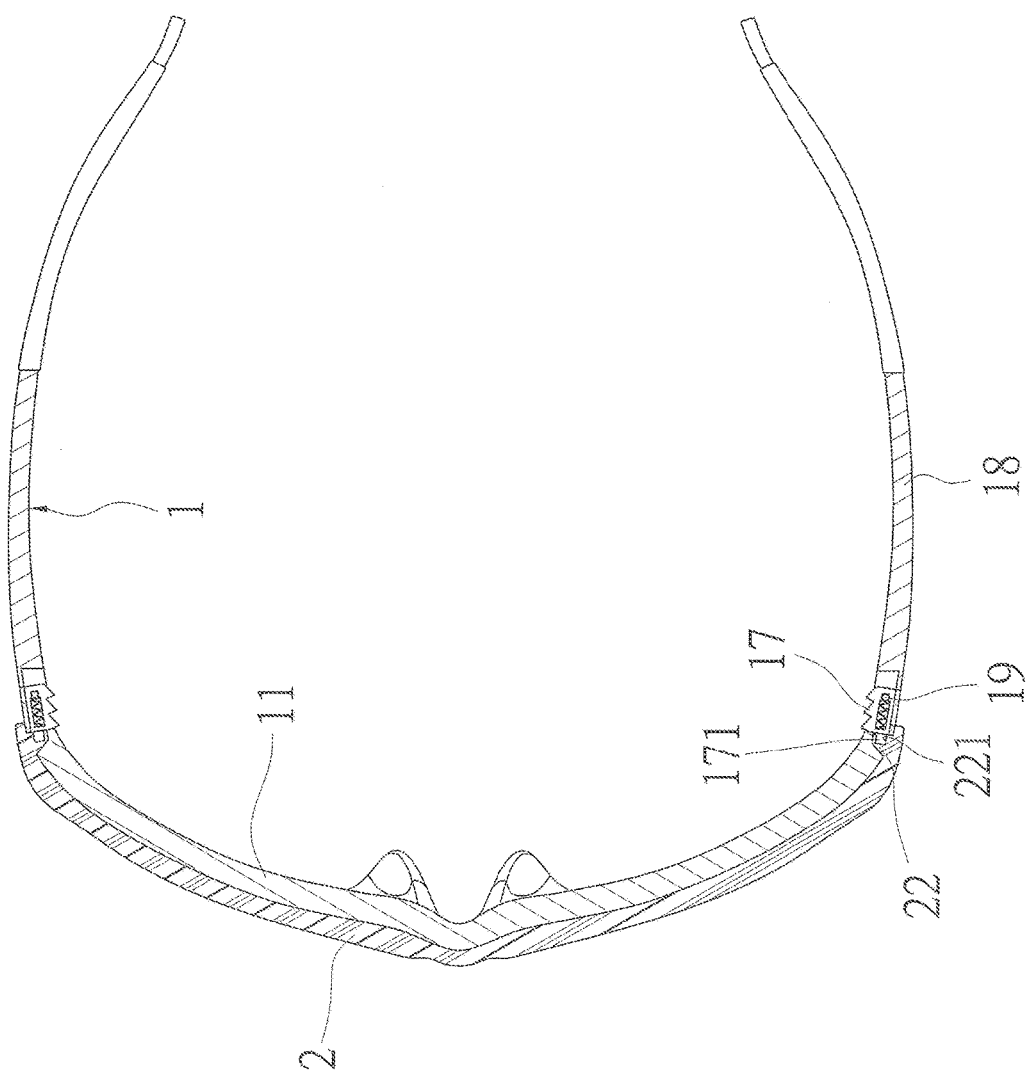
FIG. 5 is a fourth cross-sectional view of the first embodiment of this invention.

Please also refer to FIG. 4. After the positioning bumps 22 of the assistant lens frame 2 are placed in the through holes 14 of the lens frame 11 of the main spectacle frame 1, the user can release the fiddling of the fixing parts 17. At the same time, the compressed elastic parts 174 in the long slot holes 173 of the fixing parts 17 can restored to their original shape to return the positions of the fixing parts 17. The tip rods 171 of the fixing parts 17 also correspondingly insert into the tip holes 221 on lateral sides of the positioning bumps 22 of the assistant lens frame 2. Accordingly, the assistant lens frame 2 can use the positioning bumps 22 thereof to mutual position with the fixing parts 17 on two lateral sides of the lens frame 11 of the main spectacle frame 1. Then, the assistant lens frame 2 can be stably installed on the front side of the lens frame 11 of the main spectacle frame 1, as shown in FIG. 5.

Therefore, the eyesight of the user can go through the optical lens installed on the lens frame 11 of the main spectacle frame 1 for correcting his or her vision and then go through the UV lens or eye-protecting lens installed on the assistant lens frame 2 to observe the surrounding environment to prevent the damage from UV or splashing foreign matters. Furthermore, since the two sides of the assistant lens frame 2 are stably combined with the lens frame 11 of the main spectacle frame 1, the assistant lens frame 2 will not rock when the user are doing some activities. Moreover, the assembled structure above also won't have the problems of the magnetic type spectacles, i.e. the problem that the magnetic attracting force will be decreased as the using time of the magnetic parts is increased to cause that the assistant lens frame falls from the lens frame of the main spectacle frame to wear and tear the lens installed in the assistant lens frame.

Figure 6:
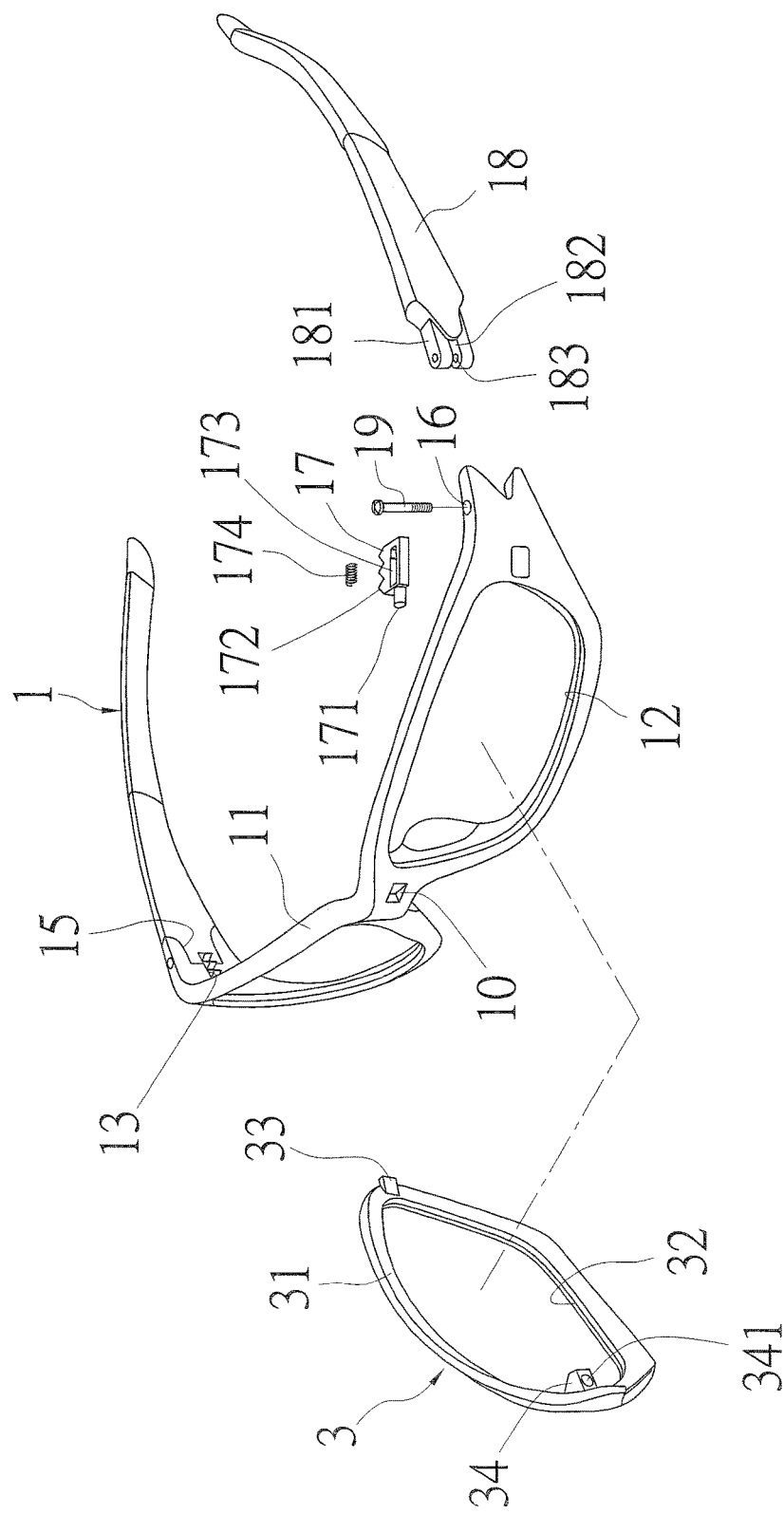
FIG. 6 is an exploded perspective view of a second embodiment of this invention.
Figure 7:
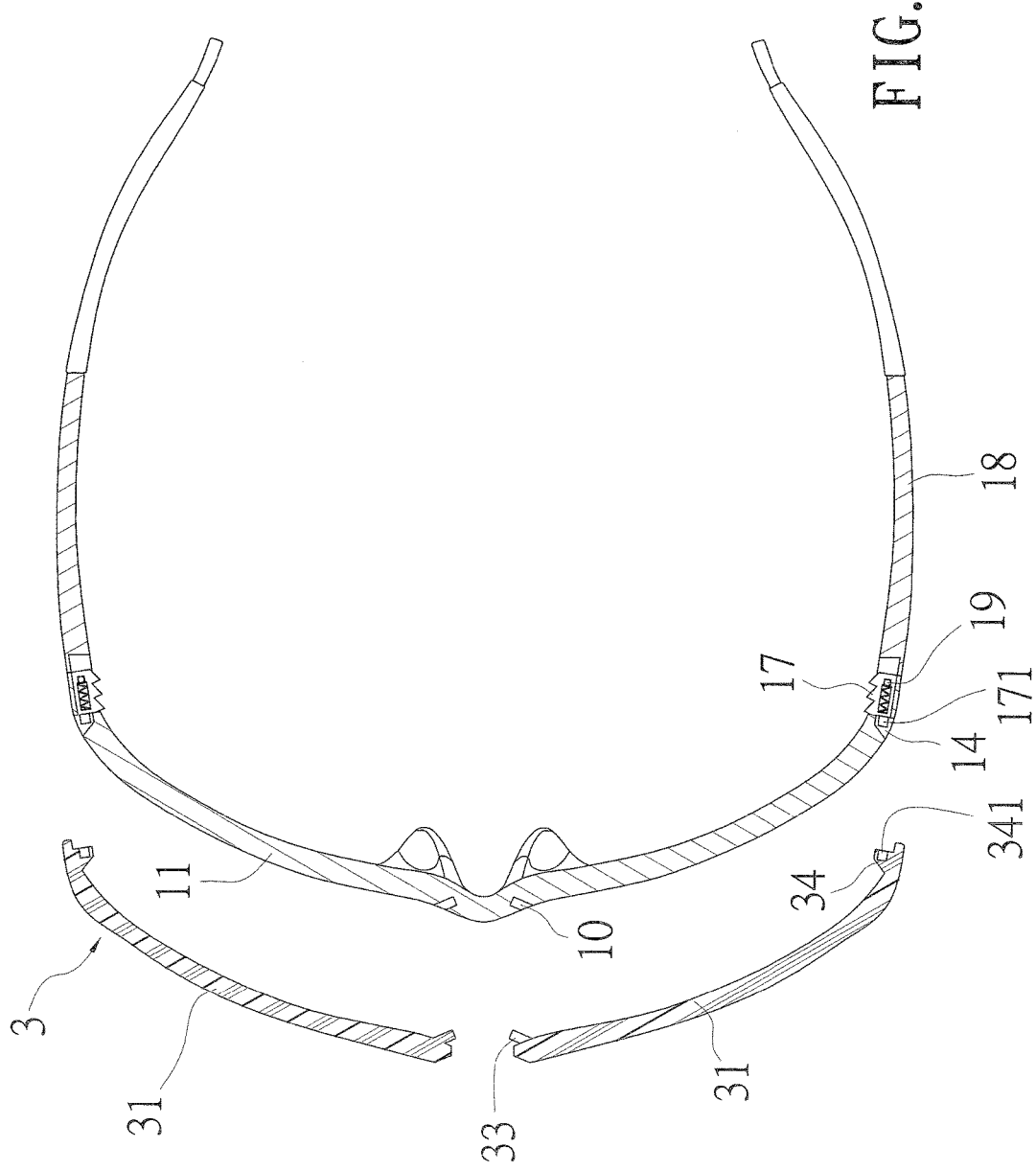
FIG. 7 is a first cross-sectional view of the second embodiment of this invention.
Figure 8:
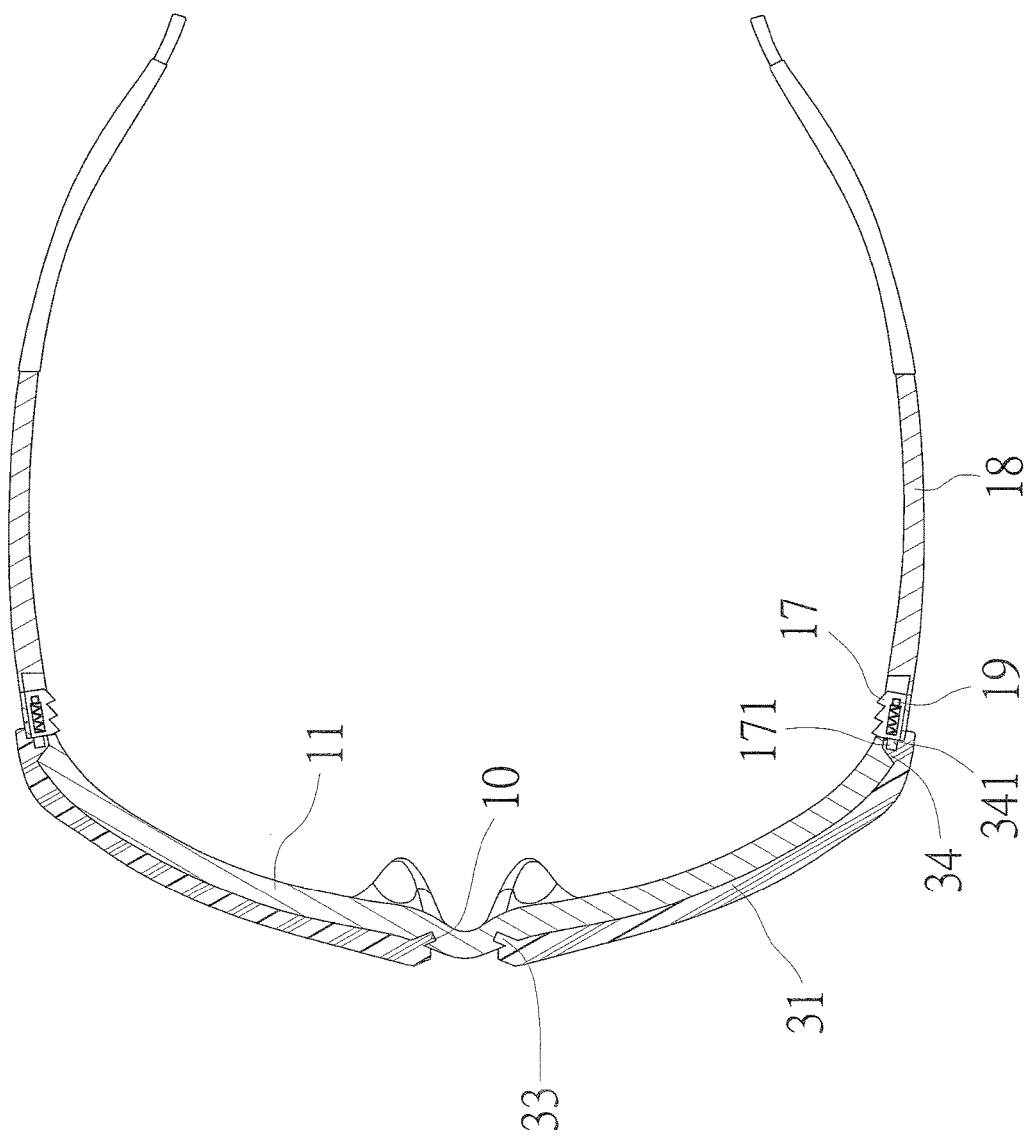
FIG. 8 is a second cross-sectional view of the second embodiment of this invention.

The embodiments or figures above are not used to limit the implementation aspects. Please refer to FIGS. 6 and 7, which show an assembled structure of a main spectacle frame and an assistant lens frame according to another embodiment. In this embodiment, the assistant lens frame 3 has two separated frame bodies 31 respectively having a second lens assembling part 32. The positions of the second lens assembling parts 32 of the two frame bodies 31 are respectively corresponding to the positions of the two first lens assembling parts 12 of the lens frame 11 of the main spectacle frame 1 to be installed by UV lens or eye-protecting lens. The two sides of the front center of the lens frame 11 of the main spectacle frame 1 respectively have a pyramidal slot 10, and two sides of the two frame bodies 31 of the assistant lens frame 3 respectively have a latch 33 and a positioning bump 34. The pyramids formed by the latches 33 of the frame bodies 31 are respectively inserted into the pyramidal slots 10 located on two sides of the center of the lens frame 11 of the main spectacle frame 1. The positioning bumps 34 of the frame bodies 31 respectively penetrate the through holes 14 on two sides of the lens frame 11 of the main spectacle frame 1. Tip holes 341 disposed on lateral sides of the positioning bumps 34 are used to be correspondingly inserted by the tip rods 171 of the fixing parts 17 on two sides of the lens frame 11 of the main spectacle 1, as shown in FIG. 8. Therefore, the stable positioning effect of the two frame bodies 31 of the assistant lens frame 3 is obtained by using the latches 33 and the positioning bumps 34 on two sides thereof as well as the lens frame 11 of the main spectacle frame 1. Some proper modifications and variations done by persons having ordinary skills in the art can be viewed as without departure from the scope of the assembled structure of an assistant lens frame of this invention.

What is claimed is:

1. An assembled structure of a main spectacle frame and an assistant lens frame, the assembled structure comprising:
   two first lens assembling parts disposed on a lens frame of the main spectacle frame;
   two sliding slots respectively disposed on two inner sides of the lens frame;
   two through holes respectively disposed on two front sides of the lens frame, wherein the through holes communicate with the sliding slots;
   two connecting slots respectively extending from the sliding slots to lateral sides of the lens frame;
   first locking holes disposed on two sides of the lens frame and penetrating the connecting slots;
   two fixing parts respectively disposed in the sliding slots on two sides of the lens frame, wherein the fixing parts each have a tip rod on one end thereof and are positioned to correspond to the through holes, a toggle part is disposed on a surface thereof protruded from the sliding slots, and a long slot hole penetrates the fixing parts from top to bottom;
   two temples respectively disposed on two sides of the lens frame, wherein a front end of each of the temples each has a connecting section to connect the connecting slots of the lens frame, a receiving part is concavely disposed in a center of the connecting section to correspond to the sliding slots of the lens frame for receiving the fixing parts, and second locking holes penetrate the connecting sections of the temples to correspond to the first locking holes of the lens frame;
   two locking parts respectively penetrating the first locking holes of the lens frame, the long slot holes of the fixing parts, and the second locking holes of the temples to pivotally connect the temples and the lens frame;
   the assistant lens frame disposed in front of the main spectacle frame;
   two second lens assembling parts disposed to correspond to the first lens assembling parts of the lens frame of the main spectacle frame;
   positioning bumps disposed on inner sides of the assistant lens frame for penetrating the through holes of the lens frame of the main spectacle frame; and
   tip holes disposed on lateral sides of the positioning bumps to correspond to the position of the tip rods of the fixing parts.

2. The assembled structure of claim 1, wherein the fixing parts each include an elastic part, one end of each of the elastic parts bearing against one adjacent end of the tip rod, and the other end of each of the elastic parts bears against one of the locking parts in the long slot holes of the fixing part.

3. The assembled structure of claim 1, wherein the toggle parts in the fixing parts have a serrated shape.

4. An assembled structure of a main spectacle frame and an assistant lens frame, the assembled structure comprising:

two first lens assembling parts disposed on a lens frame of the main spectacle frame;
two sliding slots respectively disposed on two inner sides of the lens frame;
two through holes respectively disposed on two front sides of the lens frame, wherein the through holes communicate with the sliding slots;
two connecting slots respectively extending from the sliding slots to lateral sides of the lens frame;
first locking holes disposed on two sides of the lens frame and penetrating the connecting slots;
two fixing parts respectively disposed in the sliding slots on two sides of the lens frame, wherein the fixing parts each have a tip rod on one end thereof and are positioned to correspond to the through holes, a toggle part is disposed on a surface thereof protruded from the sliding slots, and a long slot hole penetrates the fixing parts from top to bottom;
two temples respectively disposed on two sides of the lens frame, wherein a front end of each of the temples has a connecting section to connect the connecting slots of the lens frame, a receiving part is concavely disposed in a center of the connecting section to correspond to the sliding slots of the lens frame for receiving the fixing parts, and second locking holes penetrate the connecting sections of the temples to correspond to the first locking holes of the lens frame;
two locking parts respectively penetrating the first locking holes of the lens frame, the long slot holes of the fixing parts, and the second locking holes of the temples to pivotally connect the temples and the lens frame;
engagement slots disposed on two sides of a front center of the lens frame of the main spectacle frame;
the assistant lens frame disposed in front of the main spectacle frame and having two separated frame bodies;
two second lens assembling parts respectively disposed on the frame bodies to correspond to the first lens assembling parts of the lens frame of the main spectacle frame;
latches and positioning bumps disposed on two sides of the frame bodies of the assistant lens frame, wherein the latches correspond to the engagement slots on two sides of the center of the lens frame of the main spectacle frame, and the position bumps are positioned to correspondingly penetrate the through holes on two side of the lens frame of the main spectacle frame; and
tip holes disposed on lateral sides of the positioning bumps to correspond to the position of the tip rods of the fixing parts.

5. The assembled structure of claim 4, wherein the fixing parts each include an elastic part, one end of each of the elastic parts bearing against one adjacent end of the tip rod, and the other end of the elastic part in the long slot holes of the fixing parts to be against the locking parts.

6. The assembled structure of claim 4, wherein the toggle parts in the fixing parts have a serrated shape.

* * * * *